(12) United States Patent
Chen

(10) Patent No.: US 8,548,055 B2
(45) Date of Patent: Oct. 1, 2013

(54) ENCODING OF MULTIMEDIA DATA

(75) Inventor: Peisong Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1357 days.

(21) Appl. No.: 11/373,019

(22) Filed: Mar. 9, 2006

(65) Prior Publication Data

US 2006/0245496 A1   Nov. 2, 2006

Related U.S. Application Data

(60) Provisional application No. 60/660,874, filed on Mar. 10, 2005.

(51) Int. Cl.
*H04N 7/12* (2006.01)

(52) U.S. Cl.
USPC .......... 375/240.15; 375/240.12; 375/240.13; 375/240.14; 375/240.16; 375/240.24

(58) Field of Classification Search
USPC .............. 375/240.02, 240.04, 240.08, 240.1, 375/240.12, 240.14, 240.15, 240.16, 240.06, 375/240.24, 240.242, 240.01, 40.02; 386/328, 386/329, 356
See application file for complete search history.

(56) References Cited

U.S. PATENT DOCUMENTS

| | | | |
|---|---|---|---|
| 6,236,681 B1 * | 5/2001 | Varanasi et al. | 375/240.15 |
| 6,501,800 B1 * | 12/2002 | Sawada | 375/240.16 |
| 7,142,601 B2 * | 11/2006 | Kong et al. | 375/240.16 |
| 7,280,597 B2 | 10/2007 | Zhang et al. | |
| 7,532,808 B2 * | 5/2009 | Lainema | 386/328 |
| 7,680,185 B2 * | 3/2010 | Mukerjee et al. | 375/240.15 |
| 7,903,731 B2 * | 3/2011 | Cho et al. | 375/240.03 |
| 8,064,520 B2 * | 11/2011 | Mukerjee et al. | 375/240.15 |
| 8,107,539 B2 * | 1/2012 | Hannuksela et al. | 375/240.26 |
| 8,160,142 B2 * | 4/2012 | Demos | 375/240.15 |
| 8,204,129 B2 * | 6/2012 | He | 375/240.24 |
| 2005/0053297 A1 * | 3/2005 | Mukerjee et al. | 382/236 |
| 2005/0276504 A1 * | 12/2005 | Chui et al. | 382/264 |
| 2006/0045186 A1 * | 3/2006 | Koto et al. | 375/240.16 |
| 2008/0063074 A1 * | 3/2008 | Gallant et al. | 375/240.16 |
| 2009/0041117 A1 * | 2/2009 | Hannuksela | 375/240.01 |
| 2009/0245373 A1 * | 10/2009 | Tourapis et al. | 375/240.15 |
| 2010/0002945 A1 * | 1/2010 | Sugimoto et al. | 382/238 |
| 2010/0118957 A1 * | 5/2010 | Demos | 375/240.15 |
| 2011/0103479 A1 * | 5/2011 | Demos | 375/240.15 |

FOREIGN PATENT DOCUMENTS

| | | |
|---|---|---|
| KR | 20020080703 A | 10/2002 |
| KR | 20020081973 A | 10/2002 |
| KR | 20020082276 A | 10/2002 |
| RU | 2345503 C1 | 1/2009 |
| WO | WO0067486 A1 | 11/2000 |

OTHER PUBLICATIONS

Jianfeng Xu et al: "A novel rate control for H.264" Circuits and Systems, 2004. ISCAS '04 Proceedings of the 2004 International Symposium on Vancouver, BC, Canada May 23-26, 2004, Piscataway, NJ, USA, IEEE, US, pp. 809-812, May 23, 2004.

(Continued)

*Primary Examiner* — Hirdepal Singh
(74) *Attorney, Agent, or Firm* — Arent Fox LLP

(57) ABSTRACT

Methods and apparatus for coding multimedia data such as video data are disclosed. In some embodiments, such methods and apparatus determine an appropriate quantization parameter to be used for effectively coding such multimedia data.

125 Claims, 5 Drawing Sheets

(56) References Cited

OTHER PUBLICATIONS

Li, Z. et al: "Adaptive Rate Control with HRD Consideration", JVT-H014, 8th Meeting, Geneva, pp. 1-19, May 20-26, 2003.
Mahdi Ghandi, M. et al: "A Lagrangian optimized rate control algorithm for the h.264/AVC encoder". Image Processing, 2004. ICIP '04. 2004 International Conference on Singapore Oct. 24-27, 2004, Piscataway, NJ, USA, IEEE, vol. 1, 24, pp. 123-126, Oct. 2004.
Siwei MA et al: "Proposed draft description of rate control on JVT standard (JVT-F086)" Joint Video Team (JVT) of ISO/IEC MPEG & ITU-T VCEG, pp. 1-6, Dec. 5, 2002-Dec. 13, 2002.
Son, N. et al: "A novel rate-control scheme for H.264 video coding using adaptive quantization parameter", Proceedings of the SPIE—The International Society for Optical Engineering SPIE-INT. Soc. Opt. Eng USA, vol. 5600, No. 1, pp. 70-77, 2004.
Wiegand, T. et al: "Rate-Constrained Coder Control and Comparison of Video Coding Standards", IEEE Transactions on Circuits and Systems for Video Technology, IEEE Service Center, Piscataway, NJ, US, vol. 13, No. 7, pp. 688-703, Jul. 2003.
Written Opinion—PCT/US06/008770, International Search Authority—European Patent Office—Aug. 3, 2006.
International Preliminary Report on Patentability—PCT/US06/008770, The International Bureau of WIPO—Geneva, Switzerland—Sep. 12, 2007.
International Search Report—PCT/US06/008770, International Search Authority—European Patent Office—Aug. 3, 2006.
Shin, Ii-Hong, et al, "Rate control using linear rate-rho model for H.264," Signal Processing Image Communication, 2004, pp. 341-352, Issue 19, Elsevier.
Satoshi Miyaji., et al., "A Study on Optimal MC-DCT Video Coding for Ultra Low Git-Rate", Proceedings of the 1998 IEICE General Conference, Information/System 2, Mar. 6, 1998, The Institute of Electronics, Information and Communication Engineers, p. 21.
Takagi K. et al., "A Study of a Rate Control Scheme for a JVT Coder," Technical Report of the Institute of Electronics, Information and Communication Engineers, Nov. 15, 2002, vol. 102, No. 445 (MVE 2002, 67-90), pp. 123-126, ISSN: 0913-5685.
Yatabe Y. et al., "A Study on Coding of Arbirarily-shaped VOP Using Cost Functions," Proceedings of 1999 System Society Conference of the Institute of Electronics, Information and Communication Engineers, Aug. 16, 1999, p. 105.
Takagi, Koichi et al., "A Study of a Rate Control Scheme for a JVT Coder," Technical Report of the Institute of Electronics, Information and Communication Engineers, Nov. 15, 2002, vol. 102, No. 445 (MVE 2002, 67-90), pp. 123-126, ISSN: 0913-5685.
Yatabe, Yusuke et al., "A Study on Coding of Arbitrarily-shaped VOP Using Cost Functions," Proceedings of 1999 System Society Conference of the Institute of Electronics, Information and Communication Engineers, Aug. 16, 1999, p. 105.
Taiwan Search Report—TW095108338—TIPO—Mar. 18, 2012.
Text Description of Joint Model Reference Encoding Methods and Decoding Concealment Methods, Joint Video Team (JVT) of ISO/IEC MPEG and ITU-T VCEG Hong Kong, Jan 2005. Sections 2.1. 2.1.2, 2.1.3.1.1, 2.5, 3.1, 3.3.
Adachi, S. et al., "Core Experiments Description on Improved Macroblock Prediction Modes", ITU—Telecommunications Standardization Sector Study Group 16 Question 6 Video Coding Experts Group (VCEG), VCEG-061, 15th Meeting: Pattaya, Thailand, Dec. 4-6, 2001.
EPO Search Report dated Dec. 14, 2012 from related European Application No. 11007985.

\* cited by examiner

16x16   16x8   8x16

8x8

ENCODING OF MULTIMEDIA DATA

CLAIM OF PRIORITY UNDER 35 U.S.C. §119

The present Application for Patent claims priority to Provisional Application No. 60/660,874 entitled "IMPROVED B FRAME ENCODING" filed Mar. 10, 2005, and assigned to the assignee hereof and hereby expressly incorporated by reference herein.

BACKGROUND

1. Field

The invention relates generally to coding of multimedia data, and more specifically to coding of video data.

2. Background

Due to the explosive growth and great success of the Internet and wireless communication coupled with increasing demand for multimedia services, streaming multimedia over the Internet or wireless channels has drawn tremendous attention. For example, multimedia data such as video data are transmitted by a network and can be streamed by one or more clients such as mobile phones and televisions. The transmission mode can be either uni-cast or multi-cast. In the case of wireless communication systems, the air interface could be implemented by using one of the following technologies: a code division multiple access (CDMA), a frequency division multiple access (FDMA) an orthogonal frequency division multiple access (OFDMA), a time division multiple access (TDMA), a Global System for Mobile Communication (GSM) and a wideband CDMA (WCDMA).

Prior to their transmission, video data are coded. Many standards of video coding exist and some of them are MPEG-2, MPEG-4, H.263, H.264 and the like. Video data comprise three types of frames—I frames (intraframes), P frames (predicative frames) and B frames (bi-directional frames).

Turning first to I frames, they are coded without reference to any other frames. That is, they are coded using just the information in the frame itself, in the same way still images are coded by, for example, using the discrete cosine transform (DCT), quantization, run-length encoding and so on. This is called intracoding. There are generally one or two I frames associated with each second of video data. Complex frames are encoded as I frames.

With respect to P and B frames, both are coded with reference to the previous frame, that is, they are intercoded. P frames are coded with reference to a previous frame, called forward prediction. B frames are coded with reference to one or both of the previous frame (forward prediction) and the next frame (backward prediction). Use of forward, backward or both forward and backward predictions allows less bits to be used for coding because only changes from one frame to the next get coded.

Furthermore, in video coding B frames are introduced to provide better functionalities such as temporal scalability and coding efficiency. B frames could use motion compensated prediction from their neighboring past and future frames as explained above. These reference frames are encoded and then reconstructed before the B frames. Each block, e.g., a 16×16 block of pixels or macroblock (MB), in the B frame could use prediction from either direction or both directions and thus these options provide temporal scalability. Coding efficiency is achieved because only the residual data or data difference between the B frame and a reference frame determined after the prediction will be transformed, quantized and coded.

To effectively code multimedia data such as a video frame, an appropriate quantization parameter determination is needed for coding such video frame.

SUMMARY

Methods and apparatus to be described generally relate to coding of video data. In one embodiment, successive video frames comprising at least one B frame therein are received. For each of at least two coding modes indicating how a block of the B frame may be partitioned, a first motion vector being associated with the B frame and a first reference frame is determined and a cost is determined by using the first motion vector and a default quantization parameter. Based on the cost determinations, one of the coding modes is selected based on the cost determinations. A quantization parameter is determined by using the first motion vector associated with the selected coding mode. The block of the B frame is encoded by using the determined quantization parameter and the selected coding mode.

In another embodiment, successive video frames comprising at least one B frame therein are received. For two or more coding mode indicating how a block of the B frame may be partitioned, a first motion vector being associated with the B frame and a first reference frame is determined and a quantization parameter is determined for a block of the B frame by using the first motion vector. One of the quantization parameters determined for the coding modes is selected. The block of the B frame is encoded by using the selected quantization parameter and its associated coding mode.

DETAILED DESCRIPTION

The description below provides several examples regarding how the quantization parameter may be determined so that, for example, less bits could be allocated to be used for coding a video frame as compared to conventional approaches. Such bit reduction may yield higher efficiency especially for those bandwidth restricted applications such as video broadcasting.

In the following description, specific details are given to provide a thorough understanding of the embodiments. However, it will be understood by one of ordinary skill in the art that the embodiments may be practiced without these specific details. For example, electrical components may be shown in block diagrams in order not to obscure the embodiments in unnecessary detail. In other instances, such components, other structures and techniques may be shown in detail to further explain the embodiments. It is also understood by skilled artisans that electrical components, which are shown as separate blocks, can be rearranged, combined or rearranged and combined into one component.

It is also noted that some embodiments may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram and so on. When a process corresponds to a function, its termination corresponds to a return of the function to the calling function or the main function.

More particularly, it is contemplated that the methods and apparatus described herein may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, calculators, television monitors, flat panel displays, computer monitors, electronic photographs, electronic billboards or signs, projectors, architectural structures and aesthetic structures. Devices similar to those discussed herein can also be configured as non-display devices themselves, but rather to output display signals for separate display devices.

Figure 1:
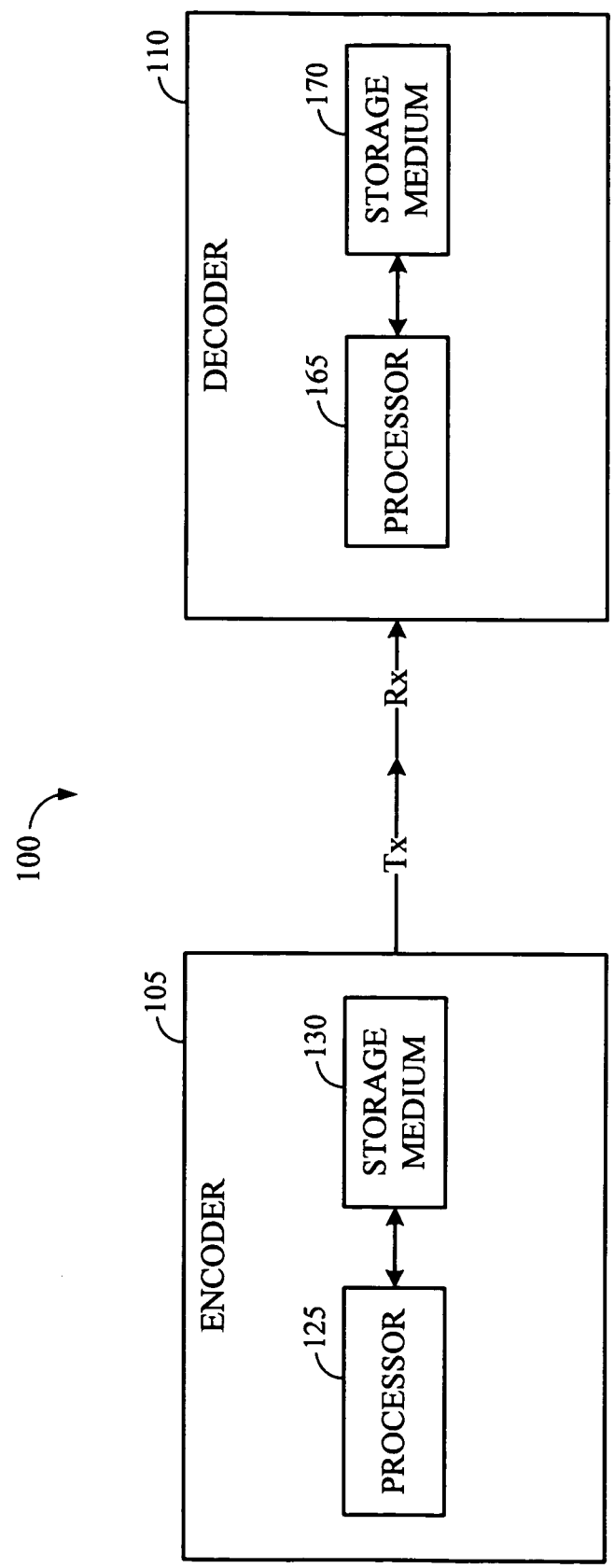
FIG. 1 illustrates a system comprising an encoder and a decoder.

FIG. 1 illustrates a system 100 comprising an encoder 105 and a decoder 110. Certain embodiments of the description above could be implemented within the encoder 105 and certain embodiments could be implemented within the decoder 110. Turning first to the encoder 105, it comprises a processor 125 coupled to a storage medium 130. The processor 105 provides a computing platform to perform some or all of the processes of other components (not shown) needed to encode the received video data. Once the received video data are encoded, such encoded video could be stored in the storage medium 130. The storage medium 130 could also be located outside of the encoder 105.

To code the received video data, the encoder 105 may use, e.g., [1] DCT to transform the received video data from being represented in the time domain to being represented in the frequency domain, [2] quantization to reduce bits required to encode the transformed video data and [3] variable length coding to determine bits needed to encode the quantized video data for eventual transmission to the decoder 110.

After the encoded video data are received by the decoder 110, the received, encoded video data are decoded. More specifically, a processor 165 of the decoder 110 provides a computing platform to perform some or all of the processes of other components (not shown) needed to decode the received, encoded video data. Once the received, encoded video data are decoded, such decoded video data could be stored in the storage medium 170 or provided to a display device (not shown). The storage medium 170 could also be located outside of the encoder 110.

Figure 2:
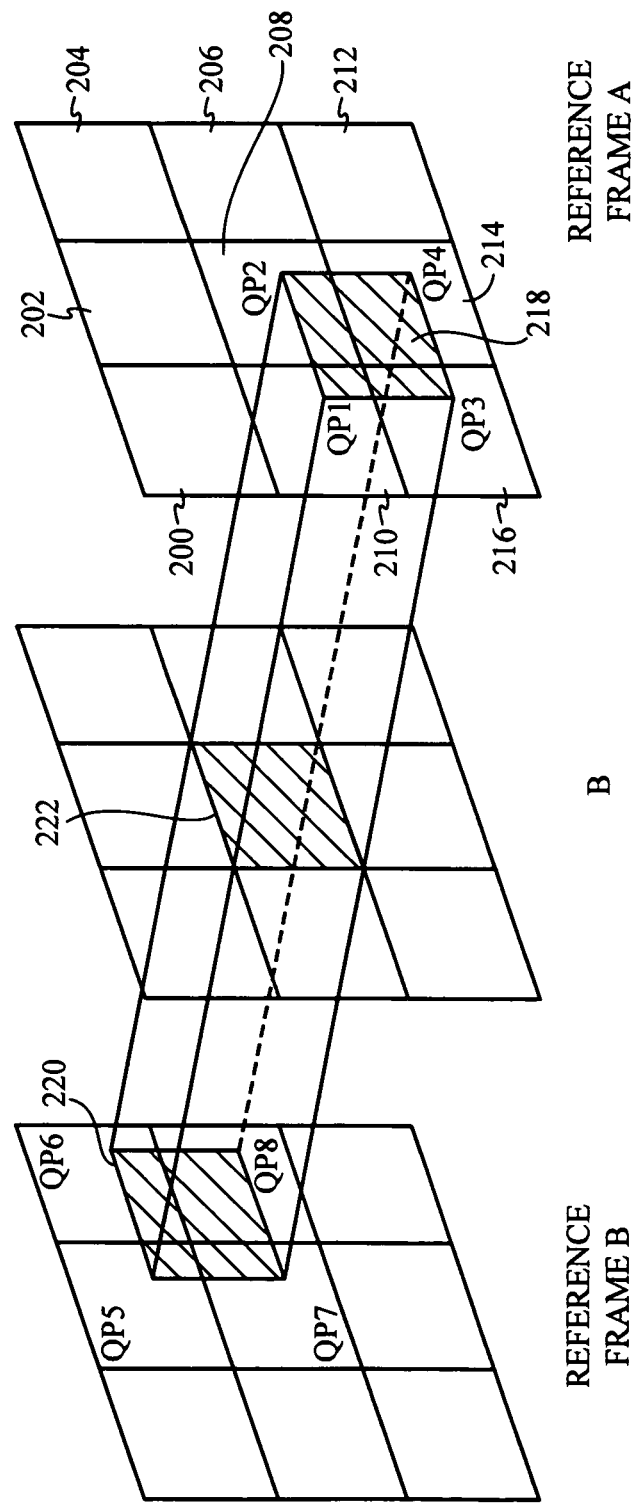
FIG. 2 illustrates a determination of quantization parameter associated with a particular block of a frame.

FIG. 2 illustrates a determination of a quantization parameter (QP) associated with a particular block of a frame such as a B frame may be determined based on at least one neighboring or reference frame. Conventional approaches typically use just one QP to encode the entire video frame. In certain instances, one or more blocks of the encoded reference frame could have a QP associated therewith because perhaps it might be desirable to encode such reference frame on a block basis by considering the quality of the video data within the block based on the properties of the Human Visual System (HVS). FIG. 2 illustrates a reference frame A comprises blocks 200-216, each of which has a QP associated therewith. More specifically, QP1 is associated with the block 210, QP2 is associated with the block 208, QP3 is associated with the block 216 and QP4 is associated with the block 214. Thus, the present disclosure describes examples of how the QP can be adaptively determined for some of blocks of pixel data of a video frame to be encoded. Such video frame may be a P frame or a B frame.

Figure 3:
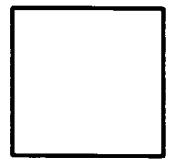
FIG. 3 illustrates various coding modes indicating how a block of a video frame could be partitioned for encoding.
Figure 3:
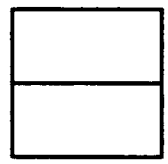
Figure 3:
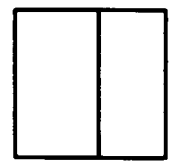
Figure 3:
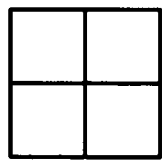
Figure 3:
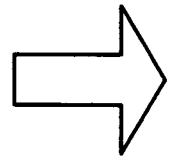
Figure 3:
Figure 3:
Figure 3:
Figure 3:

Before a particular block of a video frame is encoded, a coding mode is selected for such particular block. FIG. 3 illustrates various coding modes indicating how a block of a video frame could be partitioned. For example, a 16×16 block of pixels could be partitioned according to one of the coding modes being shown so as to correspondingly yield [a] two 16×8 partitions, [b] two 8×16 partitions or [c] four 8×8 partitions. FIG. 3 also illustrates how each of those four 8×8 partitions could be further partitioned according to other coding modes. Various coding modes could be used for partitioning and thus it should be noted that FIG. 3 illustrates some examples of the available coding modes, from which, one is selected to partition a particular block of pixel data. To determine which of the coding modes may be selected, for each coding mode, motion information, e.g., motion vector, is determined and then one of the coding modes is selected as further explained below.

Figure 4:
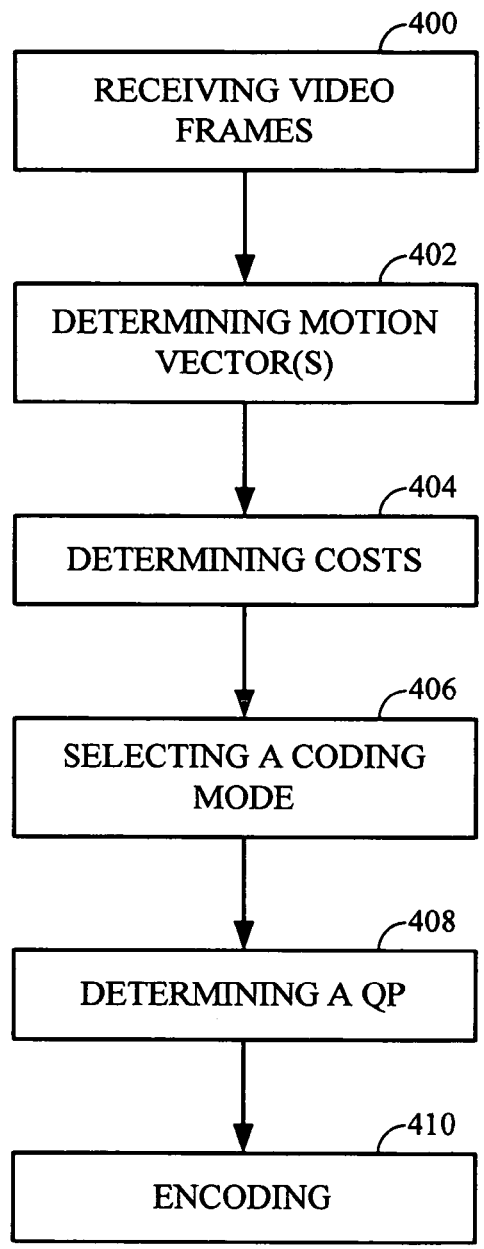
FIG. 4 illustrates an example method for encoding data.

FIG. 4 illustrates a block diagram of a method for coding a video frame having a plurality of blocks therein is further explained in light of FIGS. 2 and 4. With reference to block 400, successive video frames comprising at least one B frame therein are received. With reference to block 402, for each of at least two coding modes indicating how a particular block of the B frame may be partitioned, at least one motion vector, e.g., a first motion vector, being associated with the B frame and a first reference frame is determined. With reference to block 404, for each of the at least two coding modes, a cost is determined by using the first motion vector and a default quantization parameter. With reference to block 406, one of the coding modes is selected based on their cost determinations. With reference to block 408, a quantization parameter is determined by using the first motion vector associated with the selected coding mode. With reference to block 410, the particular block of the B frame for which the QP was determined is encoded by using such determined quantization parameter and the selected coding mode.

In some embodiments, the first reference frame is temporally received before the B frame such as the reference frame A as being illustrated in FIG. 2. In other embodiments, such reference frame is temporally received after the B frame such as the reference frame B as being illustrated in FIG. 2. Furthermore, the particular block to be encoded by using the determined QP and the selected coding mode is preferably a MB.

With reference to block 408, an area of pixels of a first reference frame associated with the particular block of the B frame based on the first motion vector could have more than one QPs being associated therewith. For example, see a shaded area 218 of the reference frame A having four QPs being associated therewith as illustrated in FIG. 2. If so, in some of the embodiments, the determination of the quantization parameter comprises calculating a weighted average of quantization parameters associated with an area of pixels in the first reference frame. Such area of pixels corresponds to the particular block of the B frame based on the first motion vector.

With reference to block 402, a first set of motion vectors being associated with the B frame and the first reference frame may be determined instead of determining just the first motion vector. If so, in some embodiments, the cost determination uses the first set of motion vectors and the default quantization parameter. Also, the determination of the quantization parameter comprises calculating a weighted average of quantization parameters associated with an area of pixels in the first reference frame. Such area of pixels corresponds to the particular block of the B frame based on the first set of motion vectors.

In addition to determining the first motion vector for each of the at least two coding modes, a second motion vector could also be determined with reference to block 402. Such second motion vector is associated with the B frame and a second reference frame. If, e.g., the first reference frame is the reference frame A as illustrated in FIG. 2, the second reference frame would be the reference frame B as illustrated in FIG. 2 or another reference frame that is also temporally received before the B frame. In these embodiments, the cost determination also uses the second motion vector and the determination of the quantization parameter comprises using the first and second motion vectors associated with the selected coding mode.

Furthermore, instead of determining just the first and second motion vectors, a first set of motion vectors being associated with the B frame and the first reference frame and a second set of motion vectors being associated with the B frame and the second reference frame may be determined with reference to block 402. For example, the first reference frame could be the reference frame A as illustrated in FIG. 2 and the second reference frame could be the reference B as illustrated in FIG. 2. If so, in these embodiments, the cost determination uses the first and second sets of motion vectors. Also, the determination of the quantization parameter comprises calculating a weighted average of QP1-QP4 associated with a first area 218 of pixels in the reference frame A and QP5-QP8 associated with a second area 220 of pixels in the reference frame B as illustrated in FIG. 2. Such first area 218 corresponds to a block 222 of the B frame based on the first set of motion vectors and the second area 220 being corresponding to the block 222 of the B frame based on the second set of motion vectors.

With reference to block 404, the cost determination may use an equation:

$$C = R + \lambda D,$$

wherein R is determined based on the first motion vector and the default quantization parameter, $\lambda$ is determined based on the default quantization parameter and D is determined based on the first motion vector and the default quantization parameter.

Figure 5:
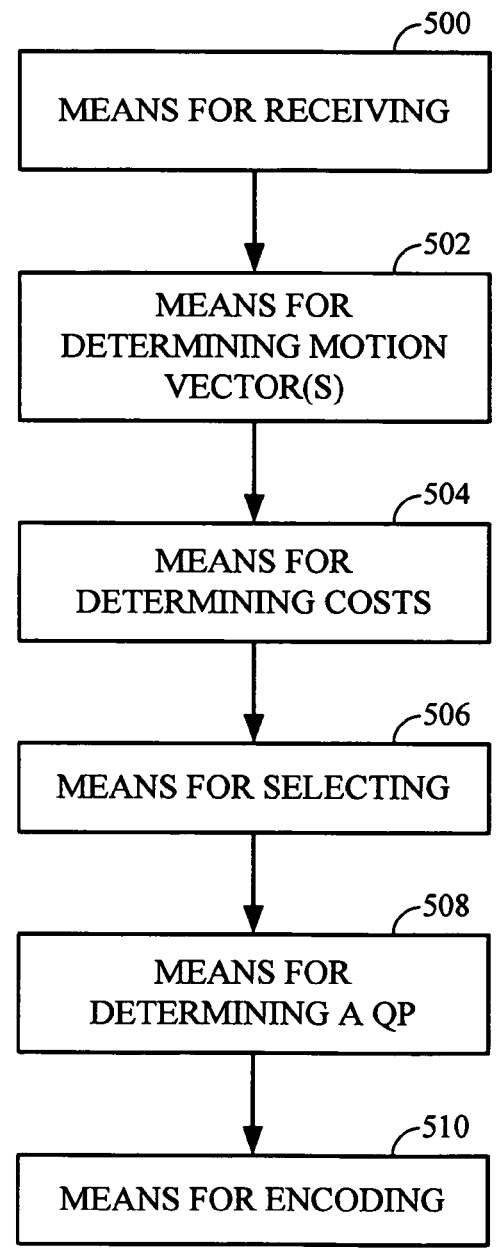
FIG. 5 illustrates an example apparatus for encoding data.

FIG. 5 illustrates a block diagram of an apparatus having certain means therein to perform certain functions. More specifically, an apparatus for coding a video frame having a plurality of blocks therein is further explained in light of FIG. 5. With reference to block 500, means for receiving is configured to receive successive video frames comprising at least one B frame therein. With reference to block 502, for each of the at least two coding modes indicating how a particular block of the B frame could be partitioned, means for determining is configured to determine at least one motion vector, e.g., a first motion vector, being associated with the B frame and a first reference frame. With reference to block 504, for each of the at least two coding modes, means for determining is configured to determine a cost by using the first motion vector and a default quantization parameter. With reference to block 506, means for selecting is configured to select one of the coding modes based on their cost determinations. With reference to block 508, means for determining is configured to determine a quantization parameter by using the first motion vector associated with the selected coding mode. With reference to block 510, means for encoding is configured to encode the particular block of the B frame for which the QP was determined by using such determined quantization parameter and the selected coding mode. The apparatus being described above in light of FIG. 5 also comprises other additional means to perform other functional aspects that are similar to those additional aspects being described in paragraphs for the method broadly illustrated by FIG. 4.

Another embodiment comprises a processor for coding a video frame having a plurality of blocks therein. More specifically, the processor is configured to receive successive video frames comprising at least one B frame therein. For each of at least two coding modes indicating how a particular block of the B frame may be partitioned, the processor is also configured to determined at least one motion vector, e.g., a first motion vector, being associated with the B frame and a first reference frame. Also for each of the at least two coding modes, the processor is configured to determine a cost by using the first motion vector and a default quantization parameter. The processor is also configured to select one of the coding modes based on their cost determinations. The processor is also configured to determine a quantization parameter by using the first motion vector associated with the selected coding mode. The processor is also configured to encode the particular block of the B frame for which the QP was determined by using such determined quantization parameter and the selected coding mode. Furthermore, the processor being described above is also configured to perform other aspects that are similar to those additional aspects being described in paragraphs for the method broadly illustrated by FIG. 4.

Another embodiment comprises an apparatus for coding a video frame having a plurality of blocks therein. More specifically, the apparatus comprises a receiver to receive successive video frames comprising at least one B frame therein. For each of the at least two coding modes indicating how a particular block of the B frame may be partitioned, the apparatus also comprises a first determiner to determine at least one motion vector, e.g., a first motion vector, being associated with the B frame and a first reference frame. Also for each of the at least two coding modes, the apparatus also comprises a second determiner to determine a cost by using the first motion vector and a default quantization parameter. The apparatus also comprises a selector to select one of the coding modes based on their cost determinations. The apparatus also comprises a third determiner to determine a quantization parameter by using the first motion vector associated with the selected coding mode. The apparatus also comprises an encoder to encode the particular block of the B frame for which the QP was determined by using such determined quantization parameter and the selected coding mode. Furthermore, the apparatus being described above also comprises additional components performing other aspects that are similar to those additional aspects being described in paragraphs for the method broadly illustrated by FIG. 4.

Another embodiment comprises a computer readable medium embodying a method for coding a video frame having a plurality of blocks therein. Such method is similar to the method broadly described above with respect to FIG. 4. Furthermore, the computer readable medium also embodies other aspects that are similar to those additional aspects being described in paragraphs for the method broadly illustrated by FIG. 4.

Figure 6:
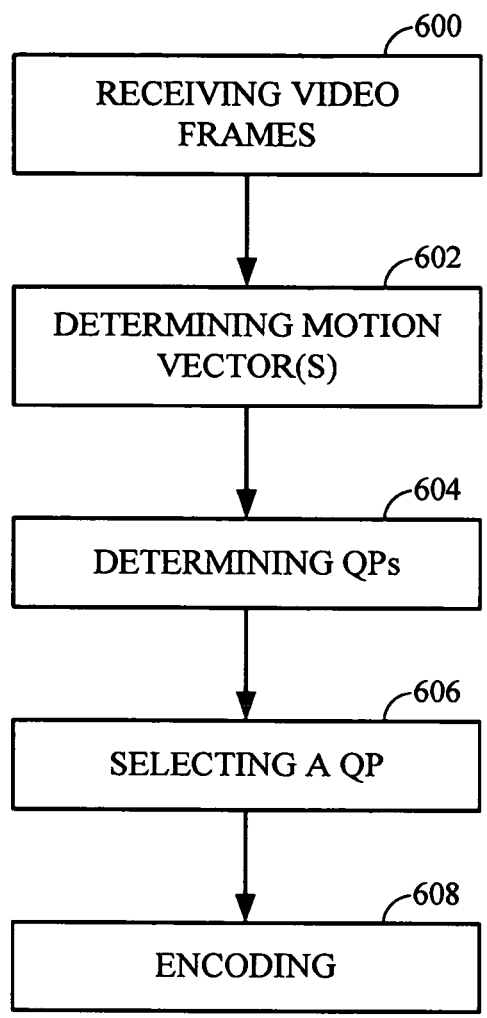
FIG. 6 illustrates another example of a method for encoding data.

FIG. 6 illustrates is a block diagram of a method for coding a video frame having a plurality of blocks therein is further explained in light of FIGS. 2 and 6. With reference to block 600, successive video frames comprising at least one B frame therein are received. With reference to block 602, for each of the at least two coding modes indicating how a block of the B frame may be partitioned at least one motion vector, e.g., a first motion vector, is determined. Such first motion vector is associated with the B frame and a first reference frame. With reference to block 604, also for each of the at least two coding modes, a quantization parameter for a particular block of the B frame is determined by using the first motion vector. With reference to block 606, one of the quantization parameters determined for the coding modes is selected. With reference to block 608, the particular block of the B frame is encoded by using the selected quantization parameter and its associated coding mode.

In some embodiments, the first reference frame is temporally received before the B frame such as the reference frame A as being illustrated in FIG. 2. In other embodiments, such reference frame is temporally received after the B frame such as the reference frame B as being illustrated in FIG. 2. Furthermore, the particular block to be encoded by using the determined QP and the selected coding mode is preferably a MB.

With reference to block 604, an area of pixels of a first reference frame associated with the particular block of the B frame based on the first motion vector could have more than one QPs being associated therewith. For example, see a shaded area 218 of the reference frame A having four QPs being associated therewith as illustrated in FIG. 2. If so, in some of the embodiments, the determination of the quantization parameter comprises calculating a weighted average of quantization parameters associated with an area of pixels in the first reference frame. Such area of pixels corresponds to the block of the B frame based on the first motion vector.

With reference to block 602, a first set of motion vectors being associated with the B frame and the first reference frame is determined instead of determining just the first motion vector. If so, in some embodiments, the determination of the quantization parameter comprises calculating a weighted average of quantization parameters associated with an area of pixels in the first reference frame. Such area of pixels corresponds to the block of the B frame based on the first set of motion vectors.

In addition to determining the first motion vector for each of the at least two coding modes, a second motion vector could also be determined. Such second motion vector is associated with the B frame and a second reference frame. In these embodiments, the determination of the quantization parameter comprises using the first and second motion vectors.

Furthermore, instead of determining just the first and second motion vectors, a first set of motion vectors being associated with the B frame and the first reference frame and a second set of motion vectors being associated with the B frame and the second reference frame may be determined with reference to block 402. For example, the first reference frame could be the reference frame A as illustrated in FIG. 2 and the second reference frame could be the reference B as illustrated in FIG. 2. If so, in these embodiments, the determination of the quantization parameter comprises calculating a weighted average of QP1-QP4 associated with a first area 218 of pixels in the reference frame A and QP5-QP8 associated with a second area 220 of pixels in the reference frame B as illustrated in FIG. 2. Such first area 218 corresponds to a block 222 of the B frame based on the first set of motion vectors and the second area 220 being corresponding to the block 222 of the B frame based on the second set of motion vectors.

With reference to block 606, the quantization parameter selection may further comprise determining a cost for each of the at least two modes by using its associated determined quantization parameter, bits to be used for encoding the block and a distortion value associated with the block. If so, the selected quantization parameter is associated with a lowest cost or one of the lowest costs.

Figure 7:
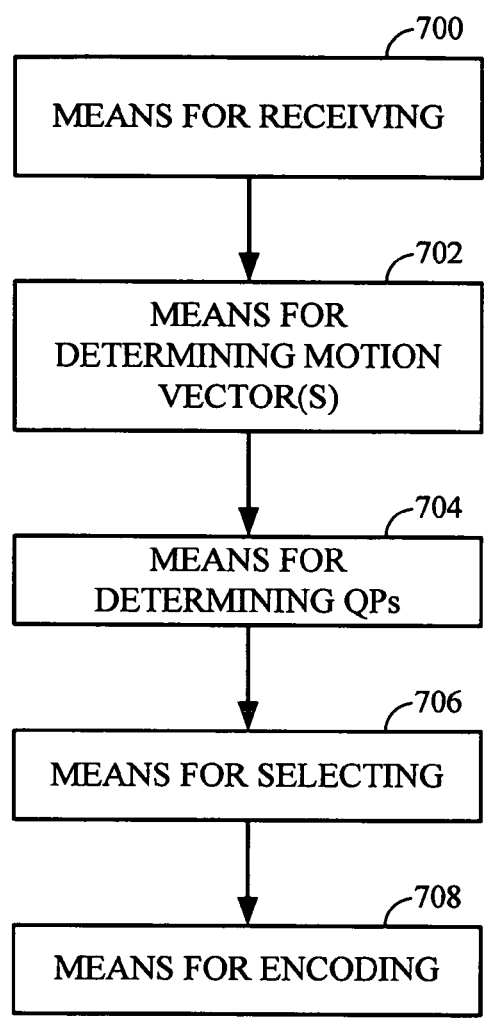
FIG. 7 illustrates another example of an apparatus for encoding data.

FIG. 7 illustrates a block diagram of an apparatus having certain means therein to perform certain functions. More specifically, an apparatus of coding a video frame having a plurality of blocks therein is further explained in light of FIG. 7. With reference to block 700, means for receiving is configured to receive successive video frames comprising at least one B frame therein. With reference to block 702, for each of the at least two coding modes indicating how a block of the B frame may be partitioned means for determining is configured to determine at least one motion vector, e.g., a first motion vector. Such first motion vector is associated with the B frame and a first reference frame. With reference to block 704, also for each of the at least two coding modes, means for determining is configured to determine a quantization parameter for a particular block of the B frame by using the first motion vector. With reference to block 706, means for selecting is configured to select one of the quantization parameters determined for the coding modes. With reference to block 708, means for encoding is configured to encode the particular block of the B frame by using the selected quantization parameter and its associated coding mode. The apparatus being described above in light of FIG. 7 also comprises other additional means to perform other functional aspects that are similar to those additional aspects being described in paragraphs for the method broadly illustrated by FIG. 6.

Another embodiment comprises a processor for coding a video frame having a plurality of blocks therein. More specifically, the processor is configured to receive successive video frames comprising at least one B frame therein. For each of the at least two coding modes indicating how a block of the B frame may be partitioned, the processor is also configured to determine at least one motion vector, e.g., a first motion vector. Such first motion vector is associated with the B frame and a first reference frame. Also for each of the at least two coding modes, the processor is also configured to determine a quantization parameter for a particular block of the B frame by using the first motion vector. The processor is also configured to select one of the quantization parameters determined for the coding modes. The processor is also configured to encode the particular block of the B frame by using the selected quantization parameter and its associated coding mode. Furthermore, the processor being described above is also configured to perform other aspects that are similar to those additional aspects being described in paragraphs for the method broadly illustrated by FIG. 6.

Another embodiment comprises an apparatus for coding a video frame having a plurality of blocks therein. More specifically, the apparatus comprises a receiver to receive successive video frames comprising at least one B frame therein. For each of the at least two coding modes indicating how a block of the B frame may be partitioned, the apparatus also comprises a first determiner to determine at least one motion vector, e.g., a first motion vector. Such first motion vector is associated with the B frame and a first reference frame. Also for each of the at least two coding modes, the apparatus comprises a second determiner to determine a quantization parameter for a particular block of the B frame by using the first motion vector. The apparatus also comprises a selector to select one of the quantization parameters determined for the coding modes. The apparatus also comprises an encoder to encode the particular block of the B frame by using the selected quantization parameter and its associated coding mode. Furthermore, the apparatus being described above also comprises additional components performing other aspects that are similar to those additional aspects being described in paragraphs for the method broadly illustrated by FIG. 6.

Another embodiment comprises a computer readable medium embodying a method for coding a video frame having a plurality of blocks therein. Such method is similar to the method broadly described above with respect to FIG. 6. Furthermore, the computer readable medium also embodies other aspects that are similar to those additional aspects being described in paragraphs for the method broadly illustrated by FIG. 6.

Those skilled in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

For the above described embodiments, a QP may be determined for each inter block, e.g., inter MB, within a frame. Such inter blocks are those blocks for which QPs could be determined based on forward, backward or both forward and backward predictions. For those intra blocks of the same frame, QPs are also needed to be determined. To do so for a particular intra block, QP(s) associated with its neighboring blocks could be used to determine a QP of that particular intra block.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the apparatus and/or method described above. Various modifications to these embodiments will be readily apparent to those skilled in the art, and the generic principles defined herein may be applied to other examples and additional elements may be added. Thus, the disclosed apparatus and method is not intended to be limited to the embodiments shown herein but is to be accorded the widest scope consistent with the principles and novel features disclosed herein.

What is claimed is:

1. A method of coding a video frame having a plurality of blocks therein comprising:
   receiving successive video frames comprising at least one bi-directional (B) frame therein;
   for at least two coding modes:
      determining a first motion vector, said first motion vector being associated with the B frame and a first reference frame;
      determining a second motion vector, said second motion vector being associated with the B frame and a second reference frame; and
      determining a cost by using the first motion vector, the second motion vector and a default quantization parameter;
   selecting one of the coding modes based on the cost determination;
   determining a quantization parameter by using the first motion vector and the second motion vector associated with the selected coding mode; and
   encoding a block of the B frame by using the determined quantization parameter and the selected coding mode.

2. The method of claim 1 wherein the first reference frame is temporally received before or after the B frame.

3. The method of claim 1, wherein the determination of the quantization parameter comprises calculating a weighted average of quantization parameters associated with an area of pixels in the first reference frame, said area of pixels being corresponding to the block of the B frame based on the first motion vector.

4. The method of claim 1:
   wherein for the selected coding mode the determination of the first motion vector comprises determining a first set of motion vectors being associated with the B frame and the first reference frame;
   further wherein the cost determination uses the first set of motion vectors and the default quantization parameter; and
   further wherein the determination of the quantization parameter comprises calculating a weighted average of quantization parameters associated with an area of pixels in the first reference frame, said area of pixels being corresponding to the block of the B frame based on the first set of motion vectors.

5. The method of claim 1:
wherein for the selected coding mode the determination of the first motion vector comprises determining a first set of motion vectors being associated with the B frame and the first reference frame;
further wherein the determination of the second motion vector comprises determining a second set of motion vectors being associated with the B frame and the second reference frame;
further wherein the cost determination uses the first and second sets of motion vectors; and
further wherein the determination of the quantization parameter comprises calculating a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

6. The method of claim 1, wherein the cost determination is based on the first motion vector and the default quantization parameter and uses an equation.

7. The method of claim 1, wherein the encoded block is a macroblock.

8. A non-transitory computer readable medium embodying a method of coding a video frame having a plurality of blocks therein, said method comprising:
receiving successive video frames comprising at least one bi-directional (B) frame therein;
for at least two coding modes:
determining a first motion vector, said first motion vector being associated with the B frame and a first reference frame;
determining a second motion vector, said second motion vector being associated with the B frame and a second reference frame; and
determining a cost by using the first motion vector, the second motion vector and a default quantization parameter;
selecting one of the coding modes based on the cost determination;
determining a quantization parameter by using the first motion vector and the second motion vector associated with the selected coding mode; and
encoding a block of the B frame by using the determined quantization parameter and the selected coding mode.

9. The computer readable medium of claim 8 wherein the first reference frame is temporally received before or after the B frame.

10. The computer readable medium of claim 8, wherein the determination of the quantization parameter comprises calculating a weighted average of quantization parameters associated with an area of pixels in the first reference frame, said area of pixels being corresponding to the block of the B frame based on the first motion vector.

11. The computer readable medium of claim 8:
wherein for the selected coding mode the determination of the first motion vector comprises determining a first set of motion vectors being associated with the B frame and the first reference frame;
further wherein the cost determination uses the first set of motion vectors and the default quantization parameter; and
further wherein the determination of the quantization parameter comprises calculating a weighted average of quantization parameters associated with an area of pixels in the first reference frame, said area of pixels being corresponding to the block of the B frame based on the first set of motion vectors.

12. The computer readable medium of claim 8:
wherein for the selected coding mode the determination of the first motion vector comprises determining a first set of motion vectors being associated with the B frame and the first reference frame;
further wherein the determination of the second motion vector comprises determining a second set of motion vectors being associated with the B frame and the second reference frame;
further wherein the cost determination uses the first and second sets of motion vectors; and
further wherein the determination of the quantization parameter comprises calculating a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

13. The computer readable medium of claim 8, wherein the cost determination is based on the first motion vector and the default quantization parameter.

14. The computer readable medium of claim 8, wherein the encoded block is a macroblock.

15. An apparatus for coding a video frame having a plurality of blocks therein comprising:
means for receiving successive video frames comprising at least one bi-directional (B) frame therein;
for at least two coding modes:
means for determining a first motion vector, said first motion vector being associated with the B frame and a first reference frame;
means for determining a second motion vector, said second motion vector being associated with the B frame and a second reference frame; and
means for determining a cost by using the first motion vector, the second motion vector and a default quantization parameter;
means for selecting one of the coding modes based on the cost determination;
means for determining a quantization parameter by using the first motion vector and the second motion vector associated with the selected coding mode; and
means for encoding a block of the B frame by using the determined quantization parameter and the selected coding mode.

16. The apparatus of claim 15, wherein the first reference frame is temporally received before or after the B frame.

17. The apparatus of claim 15, wherein means for determining the quantization parameter calculates a weighted average of quantization parameters associated with an area of pixels in the first reference frame, said area of pixels being corresponding to the block of the B frame based on the first motion vector.

18. The apparatus of claim 15:
wherein for the selected coding mode means for determining the first motion vector determines a first set of motion vectors being associated with the B frame and the first reference frame;
further wherein means for determining the cost uses the first set of motion vectors and the default quantization parameter; and further wherein means for determining the quantization parameter calculates a weighted average of quantization parameters associated with an area of pixels in the first reference frame, said area of pixels being corresponding to the block of the B frame based on the first set of motion vectors.

19. The apparatus of claim 15:
wherein for the selected coding mode means for determining of the first motion vector determines a first set of motion vectors being associated with the B frame and the first reference frame;
further wherein means for determining of the second motion vector determines a second set of motion vectors being associated with the B frame and the second reference frame;
further wherein means for determining the cost uses the first and second sets of motion vectors; and
further wherein means for determining the quantization parameter calculates a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

20. The apparatus of claim 15, wherein means for determining the cost based on the first motion vector and the default quantization parameter.

21. The apparatus of claim 15, wherein the encoded block is a macroblock.

22. A processor for coding a video frame having a plurality of blocks therein, said processor being configured to:
receive successive video frames comprising at least one bi-directional (B) frame therein;
for at least two coding modes:
determine a first motion vector, said first motion vector being associated with the B frame and a first reference frame;
determining a second motion vector, said second motion vector being associated with the B frame and a second reference frame; and
determine a cost by using the first motion vector, the second motion vector and a default quantization parameter;
select one of the coding modes based on the cost determination;
determine a quantization parameter by using the first motion vector and the second motion vector associated with the selected coding mode; and
encode a block of the B frame by using the determined quantization parameter and the selected coding mode.

23. The processor of claim 22, wherein the first reference frame is temporally received before or after the B frame.

24. The processor of claim 22, wherein the determination of the quantization parameter comprises calculating a weighted average of quantization parameters associated with an area of pixels in the first reference frame, said area of pixels being corresponding to the block of the B frame based on the first motion vector.

25. The processor of claim 22:
wherein for the selected coding mode the determination of the first motion vector comprises determining a first set of motion vectors being associated with the B frame and the first reference frame;
further wherein the cost determination uses the first set of motion vectors and the default quantization parameter; and
further wherein the determination of the quantization parameter comprises calculating a weighted average of quantization parameters associated with an area of pixels in the first reference frame, said area of pixels being corresponding to the block of the B frame based on the first set of motion vectors.

26. The processor of claim 22:
wherein for the selected coding mode the determination of the first motion vector comprises determining a first set of motion vectors being associated with the B frame and the first reference frame;
further wherein the determination of the second motion vector comprises determining a second set of motion vectors being associated with the B frame and the second reference frame;
further wherein the cost determination uses the first and second sets of motion vectors; and
further wherein the determination of the quantization parameter comprises calculating a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

27. The processor of claim 22, wherein the cost determination is based on the first motion vector and the default quantization parameter.

28. The processor of claim 22, wherein the encoded block is a macroblock.

29. An apparatus for coding a video frame having a plurality of blocks therein comprising:
a receiver for receiving successive video frames comprising at least one bi-directional (B) frame therein;
for at least two coding modes:
a first determiner for determining a first motion vector, said first motion vector being associated with the B frame and a first reference frame;
a second determiner for determining a second motion vector, said second motion vector being associated with the B frame and a second reference frame; and
a third determiner for determining a cost by using the first motion vector, the second motion vector and a default quantization parameter;
a selector for selecting one of the coding modes based on the cost determination;
a fourth determiner for determining a quantization parameter by using the first motion vector and the second motion vector associated with the selected coding mode; and
an encoder for encoding a block of the B frame by using the determined quantization parameter and the selected coding mode.

30. The apparatus of claim 29 wherein the first reference frame is temporally received before or after the B frame.

31. The apparatus of claim 29, wherein the fourth determiner calculates a weighted average of quantization parameters associated with an area of pixels in the first reference frame, said area of pixels being corresponding to the block of the B frame based on the first motion vector.

32. The apparatus of claim 29:
wherein for the selected coding mode the first determiner determines a first set of motion vectors being associated with the B frame and the first reference frame;
further wherein the third determiner uses the first set of motion vectors and the default quantization parameter; and
further wherein the fourth determiner calculates a weighted average of quantization parameters associated with an area of pixels in the first reference frame, said area of pixels being corresponding to the block of the B frame based on the first set of motion vectors.

33. The apparatus of claim 29:
wherein for the selected coding mode the first determiner determines a first set of motion vectors being associated with the B frame and the first reference frame;
further wherein the second determiner determines a second set of motion vectors being associated with the B frame and the second reference frame;
further wherein the third determiner uses the first and second sets of motion vectors; and
further wherein the fourth determiner calculates a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

34. The apparatus of claim 29, wherein the third determiner uses the first motion vector and the default quantization parameter.

35. The apparatus of claim 29, wherein the encoded block is a macroblock.

36. A method of coding a video frame having a plurality of blocks therein comprising:
receiving successive video frames comprising at least one bi-directional (B) frame therein;
for at least two coding modes:
determining a first motion vector, said first motion vector being associated with the B frame and a first reference frame;
determining a second motion vector, said second motion vector being associated with the B frame and a second reference frame; and
determining quantization parameters for a block of the B frame by using the first motion vector and the second motion vector;
selecting one of the determined quantization parameters for the at least two coding modes; and
selecting one of the quantization parameters determined for the coding modes; and
encoding the block of the B frame by using the selected quantization parameter and its associated coding mode.

37. The method of claim 36 wherein the first reference frame is temporally received before or after the B frame.

38. The method of claim 36, wherein the determination of the quantization parameter comprises calculating a weighted average of quantization parameters associated with an area of pixels in the first reference frame, said area of pixels being corresponding to the block of the B frame based on the first motion vector.

39. The method of claim 36:
wherein for one of the coding modes the determination of the first motion vector comprises determining a first set of motion vectors being associated with the B frame and the first reference frame; and
further wherein the determination of the quantization parameter comprises calculating a weighted average of quantization parameters associated with an area of pixels in the first reference frame, said area of pixels being corresponding to the block of the B frame based on the first set of motion vectors.

40. The method of claim 36:
wherein for one of the coding modes the determination of the first motion vector comprises determining a first set of motion vectors being associated with the B frame and the first reference frame;
further wherein the determination of the second motion vector comprises determining a second set of motion vectors being associated with the B frame and the second reference frame; and
further wherein the determination of the quantization parameter comprises calculating a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

41. The method of claim 36, wherein the quantization parameter selection further comprises determining a cost for each mode by using its associated determined quantization parameter, bits to be used for encoding the block and a distortion value associated with the block.

42. The method of claim 41, wherein the selected quantization parameter is associated with a lowest cost or one of the lowest costs.

43. A non-transitory computer readable medium embodying a method of coding a video frame having a plurality of blocks therein comprising:
receiving successive video frames comprising at least one bi-directional (B) frame therein;
for at least two coding modes:
determining a first motion vector, said first motion vector being associated with the B frame and a first reference frame;
determining a second motion vector, said second motion vector being associated with the B frame and a second reference frame; and
determining quantization parameters for a block of the B frame by using the first motion vector and the second motion vector;
selecting one of the determined quantization parameters for the at least two coding modes; and
encoding the block of the B frame by using the selected quantization parameter and its associated coding mode.

44. The computer readable medium of claim 43 wherein the first reference frame is temporally received before or after the B frame.

45. The computer readable medium of claim 43, wherein the determination of the quantization parameter comprises calculating a weighted average of quantization parameters associated with an area of pixels in the first reference frame, said area of pixels being corresponding to the block of the B frame based on the first motion vector.

46. The computer readable medium of claim 43:
wherein for one of the coding modes the determination of the first motion vector comprises determining a first set of motion vectors being associated with the B frame and the first reference frame; and further wherein the determination of the quantization parameter comprises calculating a weighted average of quantization parameters associated with an area of pixels in the first reference frame, said area of pixels being corresponding to the block of the B frame based on the first set of motion vectors.

47. The computer readable medium of claim 43:
wherein for one of the coding modes the determination of the first motion vector comprises determining a first set of motion vectors being associated with the B frame and the first reference frame;
further wherein the determination of the second motion vector comprises determining a second set of motion vectors being associated with the B frame and the second reference frame; and
further wherein the determination of the quantization parameter comprises calculating a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

48. The computer readable medium of claim 43, wherein the quantization parameter selection further comprises determining a cost for each mode by using its associated determined quantization parameter, bits to be used for encoding the block and a distortion value associated with the block.

49. The computer readable medium of claim 48, wherein the selected quantization parameter is associated with a lowest cost or one of the lowest costs.

50. An apparatus for coding a video frame having a plurality of blocks therein comprising:
means for receiving successive video frames comprising at least one bi-directional (B) frame therein;
for at least two coding modes:
means for determining a first motion vector, said first motion vector being associated with the B frame and a first reference frame;
means for determining a second motion vector, said second motion vector being associated with the B frame and a second reference frame; and
means for determining quantization parameters for a block of the B frame by using the first motion vector and the second motion vector;
selecting one of the determined quantization parameters for the at least two coding modes; and
means for encoding the block of the B frame by using the selected quantization parameter and its associated coding mode.

51. The apparatus of claim 50 wherein the first reference frame is temporally received before or after the B frame.

52. The apparatus of claim 50, wherein means for determining the quantization parameter calculates a weighted average of quantization parameters associated with an area of pixels in the first reference frame, said area of pixels being corresponding to the block of the B frame based on the first motion vector.

53. The apparatus of claim 50:
wherein for one of the coding modes means for determining the first motion vector determines a first set of motion vectors being associated with the B frame and the first reference frame; and
further wherein means for determining the quantization parameter calculates a weighted average of quantization parameters associated with an area of pixels in the first reference frame, said area of pixels being corresponding to the block of the B frame based on the first set of motion vectors.

54. The apparatus of claim 50:
wherein for one of the coding modes means for determining the first motion vector determines a first set of motion vectors being associated with the B frame and the first reference frame;
further wherein means for determining the second motion vector determines a second set of motion vectors being associated with the B frame and the second reference frame; and
further wherein means for determining the quantization parameter calculates a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

55. The apparatus of claim 50, wherein means for selecting determines a cost for each mode by using its associated determined quantization parameter, bits to be used for encoding the block and a distortion value associated with the block.

56. The apparatus of claim 55, wherein the selected quantization parameter is associated with a lowest cost or one of the lowest costs.

57. A processor for coding a video frame having a plurality of blocks therein, said processor being configured to:
receive successive video frames comprising at least one bi-directional (B) frame therein;
for at least two coding modes:
determine a first motion vector, said first motion vector being associated with the B frame and a first reference frame;
determine a second motion vector, said second motion vector being associated with the B frame and a second reference frame; and
determine quantization parameters for a block of the B frame by using the first motion vector and the second motion vector;
select one of the determined quantization parameters for the at least two coding modes; and
encode the block of the B frame by using the selected quantization parameter and its associated coding mode.

58. The processor of claim 57, wherein the first reference frame is temporally received before or after the B frame.

59. The processor of claim 57, wherein the determination of the quantization parameter comprises calculating a weighted average of quantization parameters associated with an area of pixels in the first reference frame, said area of pixels being corresponding to the block of the B frame based on the first motion vector.

60. The processor of claim 59:
wherein for one of the coding modes the determination of the first motion vector comprises determining a first set of motion vectors being associated with the B frame and the first reference frame; and
further wherein the determination of the quantization parameter comprises calculating a weighted average of quantization parameters associated with an area of pixels in the first reference frame, said area of pixels being corresponding to the block of the B frame based on the first set of motion vectors.

61. The processor of claim 57:
wherein for one of the coding modes the determination of the first motion vector comprises determining a first set of motion vectors being associated with the B frame and the first reference frame;
further wherein the determination of the second motion vector comprises determining a second set of motion vectors being associated with the B frame and the second reference frame; and
further wherein the determination of the quantization parameter comprises calculating a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

62. The processor of claim 57, wherein the quantization parameter selection further comprises determining a cost for each mode by using its associated determined quantization parameter, bits to be used for encoding the block and a distortion value associated with the block.

63. The processor of claim 62, wherein the selected quantization parameter is associated with a lowest cost or one of the lowest costs.

64. An apparatus for coding a video frame having a plurality of blocks therein comprising:
a receiver for receiving successive video frames comprising at least one bi-directional (B) frame therein;
for at least two coding modes:
a first determiner for determining a first motion vector, said first motion vector being associated with the B frame and a first reference frame;
a second determiner for determining a second motion vector, said second motion vector being associated with the B frame and a second reference frame; and
a third determiner for determining quantization parameters for a block of the B frame by using the first motion vector and the second motion vector;
a selector for selecting one of the determined quantization parameters for the at least two coding modes; and
an encoder for encoding the block of the B frame by using the selected quantization parameter and its associated coding mode.

65. The apparatus of claim 64 wherein the first reference frame is temporally received before or after the B frame.

66. The apparatus of claim 64, wherein the determination of the quantization parameter comprises calculating a weighted average of quantization parameters associated with an area of pixels in the first reference frame, said area of pixels being corresponding to the block of the B frame based on the first motion vector.

67. The apparatus of claim 64:
wherein for one of the coding modes the determination of the first motion vector comprises determining a first set of motion vectors being associated with the B frame and the first reference frame; and
further wherein the determination of the quantization parameter comprises calculating a weighted average of quantization parameters associated with an area of pixels in the first reference frame, said area of pixels being corresponding to the block of the B frame based on the first set of motion vectors.

68. The apparatus of claim 64:
wherein for one of the coding modes the determination of the first motion vector comprises determining a first set of motion vectors being associated with the B frame and the first reference frame;
further wherein the determination of the second motion vector comprises determining a second set of motion vectors being associated with the B frame and the second reference frame; and
further wherein the determination of the quantization parameter comprises calculating a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

69. The apparatus of claim 64, wherein the quantization parameter selection further comprises determining a cost for each mode by using its associated determined quantization parameter, bits to be used for encoding the block and a distortion value associated with the block.

70. The apparatus of claim 69, wherein the selected quantization parameter is associated with a lowest cost or one of the lowest costs.

71. A method of coding a video frame having a plurality of blocks therein comprising:
receiving successive video frames comprising at least one B frame therein;
for at least two coding modes:
determining a first set of motion vectors, said first set of motion vectors being associated with the B frame and a first reference frame; and
determining a cost by using the first set of motion vectors and a default quantization parameter;
selecting one of the coding modes based on the cost determinations;
determining a quantization parameter by calculating a weighted average of quantization parameters associated with an area of pixels in the first reference frame, said area of pixels being corresponding to a block of the B frame based on the first set of motion vectors; and
encoding the block of the B frame by using the determined quantization parameter and the selected coding mode.

72. The method of claim 71 wherein the first reference frame is temporally received before or after the B frame.

73. The method of claim 71 further comprising:
for the at least two coding modes:
determining a second motion vector, said second motion vector being associated with the B frame and a second reference frame;
further wherein the cost determination also uses the second motion vector; and
further wherein the determination of the quantization parameter comprises using the second motion vector associated with the selected coding mode.

74. The method of claim 73:
wherein for a selected coding mode the determination of the second motion vector comprises determining a second set of motion vectors being associated with the B frame and the second reference frame;
further wherein the cost determination uses the first and second sets of motion vectors; and
further wherein the determination of the quantization parameter comprises calculating a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

75. The method of claim 71, wherein the encoded block is a macroblock.

76. A non-transitory computer readable medium embodying a method of coding a video frame having a plurality of blocks therein, said method comprising:
receiving successive video frames comprising at least one bi-directional (B) frame therein;
for at least two coding modes:
determining a first set of motion vectors, said first motion vector being associated with the B frame and a first reference frame;
determining a cost by using the first set of motion vectors and a default quantization parameter;
selecting one of the coding modes based on the cost determinations;
determining a quantization parameter by using the first motion vector and the second motion vector associated with the selected coding mode by calculating a weighted average of quantization parameters associated with an area of pixels in the first reference frame, said area of pixels being corresponding to a block of the B frame based on the first set of motion vectors; and
encoding the block of the B frame by using the determined quantization parameter and the selected coding mode.

77. The computer readable medium of claim 76 wherein the first reference frame is temporally received before or after the B frame.

78. The computer readable medium of claim 76:
for the two or more coding modes:
determining a second motion vector, said second motion vector being associated with the B frame and a second reference frame;
further wherein the cost determination also uses the second motion vector; and
further wherein the determination of the quantization parameter comprises using the second motion vector associated with the selected coding mode.

79. The computer readable medium of claim 78:
wherein the determination of the second motion vector comprises determining a second set of motion vectors being associated with the B frame and the second reference frame;
further wherein the cost determination uses the first and second sets of motion vectors;
and further wherein the determination of the quantization parameter comprises calculating a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

80. The computer readable medium of claim 76, wherein the encoded block is a macroblock.

81. An apparatus for coding a video frame having a plurality of blocks therein comprising:
means for receiving successive video frames comprising at least one bi-directional (B) frame therein;
for at least two coding modes:
means for determining a first set of motion vector, said first motion vector being associated with the B frame and a first reference frame;
means for determining a cost by using the first set of motion vectors and a default quantization parameter;
means for selecting one of the coding modes based on the cost determinations;
means for determining a quantization parameter by using the first motion vector associated with the selected coding mode by calculating a weighted average of quantization parameters associated with an area of pixels in the first reference frame, said area of pixels being corresponding to a block of the B frame based on the first set of motion vectors; and
means for encoding the block of the B frame by using the determined quantization parameter and the selected coding mode.

82. The apparatus of claim 81, wherein the first reference frame is temporally received before or after the B frame.

83. The apparatus of claim 81 further comprising:
for the at least two coding modes:
means for determining a second motion vector, said second motion vector being associated with the B frame and a second reference frame;
further wherein means for determining the cost also uses the second motion vector; and
further wherein means for determining the quantization parameter uses the second motion vectors associated with the selected coding mode.

84. The apparatus of claim 83:
wherein means for determining of the second motion vector determines a second set of motion vectors being associated with the B frame and the second reference frame;
further wherein means for determining the cost uses the first and second sets of motion vectors; and
further wherein means for determining the quantization parameter calculates a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

85. The apparatus of claim 81 wherein the encoded block is a macroblock.

86. A processor for coding a video frame having a plurality of blocks therein, said processor being configured to:
receive successive video frames comprising at least one bi-directional (B) frame therein;
for at least two coding modes:
determine a first set of motion vectors, said first set of motion vectors being associated with the B frame and a first reference frame;
determine a cost by using the first set of motion vectors and a default quantization parameter;
select one of the coding modes based on the cost determinations;
determine a quantization parameter by using the first set of motion vectors associated with the selected coding mode by calculating a weighted average of quantization parameters associated with an area of pixels in the first reference frame, said area of pixels being corresponding to a block of the B frame based on the first set of motion vectors; and encode the block of the B frame by using the determined quantization parameter and the selected coding mode.

87. The processor of claim 86, wherein the first reference frame is temporally received before or after the B frame.

88. The processor of claim 86 further comprising:
for the at least two coding modes:
determining a second motion vector, said second motion vector being associated with the B frame and a second reference frame;
further wherein the cost determination also uses the second motion vector; and
further wherein the determination of the quantization parameter comprises using the second motion vector associated with the selected coding mode.

89. The processor of claim 88:
wherein the determination of the second motion vector comprises determining a second set of motion vectors being associated with the B frame and the second reference frame;
further wherein the cost determination uses the first and second sets of motion vectors; and
further wherein the determination of the quantization parameter comprises calculating a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

90. The processor of claim 86, wherein the encoded block is a macroblock.

91. An apparatus for coding a video frame having a plurality of blocks therein comprising:
a receiver successive video frames comprising at least one bi-directional (B) frame therein;
for at least two coding modes:
a first determiner for determining a first set of motion vectors, said first motion vector being associated with the B frame and a first reference frame;
a second determiner for determining a cost by using the first set of motion vectors and a default quantization parameter;
a selector for selecting one of the coding modes based on the cost determinations;
a third determiner for determining a quantization parameter by using the first sets of motion vectors associated with the selected coding mode by calculating a weighted average of quantization parameters associated with an area of pixels in the first reference frame, said area of pixels being corresponding to a block of the B frame based on the first set of motion vectors; and
an encoder for encoding the block of the B frame by using the determined quantization parameter and the selected coding mode.

92. The apparatus of claim 91 wherein the first reference frame is temporally received before or after the B frame.

93. The apparatus of claim 91 further comprising:
for the at least two coding modes:
a fourth determiner for determining a second motion vector, said second motion vector being associated with the B frame and a second reference frame;
further wherein the second determiner also uses the second motion vector; and
further wherein the third determiner uses the second motion vectors associated with the selected coding mode.

94. The apparatus of claim 91:
wherein the fourth determiner determines a second set of motion vectors being associated with the B frame and the second reference frame;
further wherein the third determiner uses the first and second sets of motion vectors; and
further wherein the fourth determiner calculates a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

95. The apparatus of claim 91, wherein the encoded block is a macroblock.

96. A method of coding a video frame having a plurality of blocks therein comprising:
receiving successive video frames comprising at least one bi-directional (B) frame therein;
for at least two coding modes:
determining a first set of motion vectors, said first set of motion vectors being associated with the B frame and a first reference frame;
determining a quantization parameter for a block of the B frame by using the first set of motion vectors by calculating a weighted average of quantization parameters associated with an area of pixels in the first reference frame, said area of pixels being corresponding to the block of the B frame based on the first set of motion vectors;
selecting one of the quantization parameters determined for the coding modes; and
encoding the block of the B frame by using the selected quantization parameter and its associated coding mode.

97. The method of claim 96 wherein the first reference frame is temporally received before or after the B frame.

98. The method of claim 96 further comprising:
for the at least two coding modes:
determining a second motion vector, said second motion vector being associated with the B frame and a second reference frame, wherein the determination of the quantization parameter comprises using the second motion vector.

99. The method of claim 98:
further wherein the determination of the second motion vector comprises determining a second set of motion vectors being associated with the B frame and the second reference frame;
and further wherein the determination of the quantization parameter comprises calculating a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

100. The method of claim 96, wherein the quantization parameter selection further comprises determining a cost for each mode by using its associated determined quantization parameter, bits to be used for encoding the block and a distortion value associated with the block.

101. The method of claim 100, wherein the selected quantization parameter is associated with a lowest cost or one of the lowest costs.

102. A non-transitory computer readable medium embodying a method of coding a video frame having a plurality of blocks therein comprising:
receiving successive video frames comprising at least one bi-directional (B) frame therein;
for at least two coding modes:
determining a first set of motion vectors, said first set of motion vectors being associated with the B frame and a first reference frame;
determining a quantization parameter for a block of the B frame by using the first set of motion vectors by calculating a weighted average of quantization parameters associated with an area of pixels in the first reference frame, said area of pixels being corresponding to the block of the B frame based on the first set of motion vectors;
selecting one of the quantization parameters determined for the coding modes;
and
encoding the block of the B frame by using the selected quantization parameter and its associated coding mode.

103. The computer readable medium of claim 102 wherein the first reference frame is temporally received before or after the B frame.

104. The computer readable medium of claim 102 further comprising:
for the at least two coding modes:
determining a second motion vector, said second motion vector being associated with the B frame and a second reference frame, wherein the determination of the quantization parameter comprises using the second motion vector.

105. The computer readable medium of claim 94:
further wherein the determination of the second motion vector comprises determining a second set of motion vectors being associated with the B frame and the second reference frame;
and
further wherein the determination of the quantization parameter comprises calculating a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

106. The computer readable medium of claim 102, wherein the quantization parameter selection further comprises determining a cost for each mode by using its associated determined quantization parameter, bits to be used for encoding the block and a distortion value associated with the block.

107. The computer readable medium of claim 106, wherein the selected quantization parameter is associated with a lowest or one of the lowest costs.

108. An apparatus for coding a video frame having a plurality of blocks therein comprising:
means for receiving successive video frames comprising at least one bi-directional (B) frame therein;
for at least two modes:
means for determining a first set of motion vectors, said first set of motion vectors being associated with the B frame and a first reference frame;
means for determining a quantization parameter for a block of the B frame by using the first motion vector by calculating a weighted average of quantization parameters associated with an area of pixels in the first reference frame, said area of pixels being corresponding to the block of the B frame based on the first set of motion vectors;
selecting one of the quantization parameters determined for the coding modes;
and
means for encoding the block of the B frame by using the selected quantization parameter and its associated coding mode.

109. The apparatus of claim 108 wherein the first reference frame is temporally received before or after the B frame.

110. The apparatus of claim 108 further comprising:
for the at least two coding modes:
means for determining a second motion vector, said second motion vector being associated with the B frame and a second reference frame, wherein the means for determining the quantization parameter uses the second motion vector.

111. The apparatus of claim 110:
further wherein means for determining the second motion vector determines a second set of motion vectors being associated with the B frame and the second reference frame; and
further wherein means for determining the quantization parameter calculates a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

112. The apparatus of claim 108, wherein means for selecting determines a cost for each mode by using its associated determined quantization parameter, bits to be used for encoding the block and a distortion value associated with the block.

113. The apparatus of claim 112, wherein the selected quantization parameter is associated with a lowest cost or one of the lowest costs.

114. A processor for coding a video frame having a plurality of blocks therein, said processor being configured to:
receive successive video frames comprising at least one bi-directional (B) frame therein;
for at least two coding modes:
determine a first set of motion vectors, said first set of motion vectors being associated with the B frame and a first reference frame;
determine a quantization parameter for a block of the B frame by using the first set of motion vectors by calculating a weighted average of quantization parameters associated with an area of pixels in the first reference frame, said area of pixels being corresponding to the block of the B frame based on the first set of motion vectors;
select one of the quantization parameters determined for the coding modes; and
encode the block of the B frame by using the selected quantization parameter and its associated coding mode.

115. The processor of claim 114, wherein the first reference frame is temporally received before or after the B frame.

116. The processor of claim 114 further being configured to:
for the at least two coding modes:
determine a second motion vector, said second motion vector being associated with the B frame and a second reference frame, wherein the determination of the quantization parameter comprises using the second motion vector.

117. The processor of claim 116:
further wherein the determination of the second motion vector comprises determining a second set of motion vectors being associated with the B frame and the second reference frame;
and
further wherein the determination of the quantization parameter comprises calculating a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

118. The processor of claim 114, wherein the quantization parameter selection further comprises determining a cost for each mode by using its associated determined quantization parameter, bits to be used for encoding the block and a distortion value associated with the block.

119. The processor of claim 118, wherein the selected quantization parameter is associated with a lowest cost or one of the lowest costs.

120. An apparatus for coding a video frame having a plurality of blocks therein comprising:
a receiver for receiving successive video frames comprising at least one bi-directional (B) frame therein;
for at least two coding modes:
a first determiner for determining a first set of motion vectors, said first set of motion vectors being associated with the B frame and a first reference frame;
a second determiner for determining a quantization parameter for a block of the B frame by using the first set of motion vectors by calculating a weighted average of quantization parameters associated with an area of pixels in the first reference frame, said area of pixels being corresponding to the block of the B frame based on the first set of motion vectors;
a selector for selecting one of the quantization parameters determined for the coding modes; and
an encoder for encoding the block of the B frame by using the selected quantization parameter and its associated coding mode.

121. The apparatus of claim 120 wherein the first reference frame is temporally received before or after the B frame.

122. The apparatus of claim 120 further comprising:
for the at least two coding modes:
determining a second motion vector, said second motion vector being associated with the B frame and a second reference frame, wherein the determining of the quantization parameter comprises using the second motion vector.

123. The apparatus of claim 122:
further wherein the determination of the second motion vector comprises determining a second set of motion vectors being associated with the B frame and the second reference frame;
and
further wherein the determination of the quantization parameter comprises calculating a weighted average of quantization parameters associated with a first area of pixels in the first reference frame and a second area of pixels in the second reference frame, said first area of pixels being corresponding to the block of the B frame based on the first set of motion vectors and said second area of pixels being corresponding to the block of the B frame based on the second set of motion vectors.

124. The apparatus of claim 120, wherein the quantization parameter selection further comprises determining a cost for each mode by using its associated determined quantization parameter, bits to be used for encoding the block and a distortion value associated with the block.

125. The apparatus of claim 124, wherein the selected quantization parameter is associated with a lowest cost or one of the lowest costs.

* * * * *